(12) United States Patent
Maher, III et al.

(10) Patent No.: US 7,406,709 B2
(45) Date of Patent: Jul. 29, 2008

(54) APPARATUS AND METHOD FOR ALLOWING PEER-TO-PEER NETWORK TRAFFIC ACROSS ENTERPRISE FIREWALLS

(75) Inventors: Robert Daniel Maher, III, Plano, TX (US); Aswinkumar Vishanji Rana, Plano, TX (US); Milton Andre Lie, McKinney, TX (US); James Robert Deerman, Lucas, TX (US)

(73) Assignee: Audiocodes, Inc., Plano, TX (US)

( * ) Notice: Subject to any disclaimer, the term of this patent is extended or adjusted under 35 U.S.C. 154(b) by 770 days.

(21) Appl. No.: 10/657,813

(22) Filed: Sep. 8, 2003

(65) Prior Publication Data
US 2004/0128554 A1 Jul. 1, 2004

Related U.S. Application Data

(60) Provisional application No. 60/409,391, filed on Sep. 9, 2002.

(51) Int. Cl.
*G06F 21/00* (2006.01)
*G06F 15/16* (2006.01)
*H04L 9/00* (2006.01)
*H04K 1/00* (2006.01)

(52) U.S. Cl. .......................... 726/12; 726/14; 713/168; 709/226; 709/228

(58) Field of Classification Search .................. 726/12
See application file for complete search history.

(56) References Cited

U.S. PATENT DOCUMENTS 5,781,550 A 7/1998 Templin et al.
5,793,763 A 8/1998 Mayes et al.

(Continued)

FOREIGN PATENT DOCUMENTS

WO 99/44363 A1 9/1999

(Continued)

OTHER PUBLICATIONS

International Search Report mailed Oct. 13, 2004 for corresponding PCT Application No. PCT/US03/27917, 5 total pages.

(Continued)

*Primary Examiner*—Christopher A Revak
(74) *Attorney, Agent, or Firm*—Haynes and Boone, LLP

(57) ABSTRACT

A system and method for allowing bidirectional network traffic to pass through a network address translation ("NAT")/firewall device thereby allowing bidirectional traffic to flow between the private side of the NAT/firewall device and the public side of the NAT/firewall device while maintaining security between the public side and the private side is described. A network processing system on the public side of the NAT/firewall device anchors network traffic to and from the private side of the NAT/firewall device. A traversal client resides on the private side of the NAT/firewall device and has a secure connection with the network processing system. The traversal client is operable to pass signaling packets bound for a terminal on the private side of the NAT/firewall from the network processing system. The traversal client is also operable to send test packets through the NAT/firewall to create the allocations in the NAT/firewall to allow the bidirectional traffic to pass from the public side to the private side.

15 Claims, 9 Drawing Sheets

U.S. PATENT DOCUMENTS

| | | | |
|---|---|---|---|
| 6,128,664 A | 10/2000 | Yanagidate et al. | |
| 6,202,081 B1 * | 3/2001 | Naudus | 709/200 |
| 6,233,688 B1 * | 5/2001 | Montenegro | 726/11 |
| 6,240,449 B1 | 5/2001 | Nadeau | |
| 6,473,406 B1 * | 10/2002 | Coile et al. | 370/248 |
| 6,553,422 B1 * | 4/2003 | Nelson | 709/227 |
| 6,839,761 B2 * | 1/2005 | Kadyk et al. | 709/229 |
| 6,996,841 B2 * | 2/2006 | Kadyk et al. | 726/12 |
| 7,068,647 B2 * | 6/2006 | Fangman et al. | 370/352 |
| 7,143,137 B2 * | 11/2006 | Maufer et al. | 709/205 |
| 7,143,188 B2 * | 11/2006 | Maufer et al. | 709/245 |
| 7,167,920 B2 * | 1/2007 | Traversat et al. | 709/230 |
| 7,206,934 B2 * | 4/2007 | Pabla et al. | 713/168 |
| 2002/0199114 A1 * | 12/2002 | Schwartz | 713/201 |
| 2003/0033418 A1 * | 2/2003 | Young et al. | 709/230 |
| 2003/0118002 A1 * | 6/2003 | Bradd et al. | 370/352 |
| 2003/0135616 A1 * | 7/2003 | Carrico et al. | 709/225 |
| 2003/0140142 A1 * | 7/2003 | Marples et al. | 709/225 |
| 2003/0188001 A1 * | 10/2003 | Eisenberg et al. | 709/229 |
| 2003/0227903 A1 * | 12/2003 | Watson | 370/352 |
| 2005/0238034 A1 * | 10/2005 | Gillespie et al. | 370/401 |
| 2005/0251856 A1 * | 11/2005 | Araujo et al. | 726/12 |
| 2005/0273849 A1 * | 12/2005 | Araujo et al. | 726/12 |
| 2006/0098622 A1 * | 5/2006 | Chang et al. | 370/352 |
| 2006/0101510 A1 * | 5/2006 | Kadyk et al. | 726/12 |
| 2006/0168321 A1 * | 7/2006 | Eisenberg et al. | 709/238 |
| 2006/0215684 A1 * | 9/2006 | Capone | 370/437 |
| 2006/0272009 A1 * | 11/2006 | Stott | 726/3 |
| 2006/0291502 A1 * | 12/2006 | Kalofonos | 370/466 |
| 2007/0022289 A1 * | 1/2007 | Alt et al. | 713/168 |
| 2007/0157303 A1 * | 7/2007 | Pankratov | 726/11 |
| 2007/0165579 A1 * | 7/2007 | Delibie et al. | 370/338 |
| 2008/0037537 A1 * | 2/2008 | Yao et al. | 370/389 |

FOREIGN PATENT DOCUMENTS

WO     02/45373 A2     6/2002

OTHER PUBLICATIONS

Sterman, Baruch, Ph.D., et al., "NAT Traversal in SIP", DeltaThree The IP Communications Network, 17 total pages, no date provided.

* cited by examiner

APPARATUS AND METHOD FOR ALLOWING PEER-TO-PEER NETWORK TRAFFIC ACROSS ENTERPRISE FIREWALLS

CROSS-REFERENCE TO RELATED APPLICATION

This application claims priority of Provisional Application Ser. No. 60/409,391 which was filed Sep. 9, 2002.

TECHNICAL FIELD OF THE INVENTION

The present invention relates to broadband data networking equipment. Specifically, the present invention relates to a network processing system and associated agent that allow peer to peer network traffic to cross firewall and network address translation/network address port translation (NAT/NAPT) boundaries.

BACKGROUND OF THE INVENTION

Firewall and Network Address Translation (NAT) devices have been around since the introduction of the Internet, however they were not designed for complex peer-to-peer and media applications such as Voice over Internet Protocol (VoIP). As a result, today's installed base of enterprise firewall and NAT devices create barriers to VoIP interconnection, and can deny service providers the ability to distribute VoIP end-to-end. Service providers need to be able to cross these barriers and bridge VoIP island networks without compromising enterprise security or expecting enterprise customers to upgrade their equipment.

In order to ensure ubiquitous VoIP with today's existing infrastructures, existing firewall and NAT devices will require significant upgrades or replacement, as well as re-architecting major portions of the network infrastructure. Not only do these methods involve more equipment to configure, manage, and secure against malicious attack, but, with the lack of native VoIP capabilities, it forces enterprise networks to deploy expensive gateways and other equipment.

It has become apparent that VoIP and other peer-to-peer applications cannot function properly across these network devices, unless they are "application aware", that is unless they are able to understand the type and nature of the traffic passing through them. In order to understand the problems inherent in today's network deployments, a thorough understanding of the VoIP architecture and the algorithms used by NAT/NAPT/Firewalls is required.

Internet Protocol (IP) addresses are names that uniquely identify a device on the Internet. To insure uniqueness, IP version 4 (IPv4) addresses were defined as unsigned 32 bit values, which yield 4.29 billion possible public addresses. Certain organizations were tasked with managing the Internet's address space. Their responsibility is to know who is using specific IPv4 addresses at any point in time. It is also their responsibility to ensure that not more than one entity is using the same IPv4 address at any given point in time. There is one group of IPv4 addresses that do not fall under the jurisdiction of these addressing authorities, those being private IPv4 addresses. There are three categories of IPv4 addresses, which have been reserved for private usage: 10.0.0.0/8 (Class A—16.7M addresses), 172.16.0.0/16 (Class B—65.5 k addresses), and 192.168.0.0/24 (Class C—256 k addresses). These addresses may be freely used by any organization. The one disadvantage to using these private addresses is that they may not be used for connectivity over the public Internet, since they could be being used by multiple entities on the Internet.

Unfortunately, the current number of addresses allowed under IPv4 is not enough for the explosive growth of the Internet. One solution to the problem of address scarcity is to use a new addressing scheme. IP version 6 (IPv6) allows for the network to have 128 bit Internet addresses, which yield $3.4*10^{38}$ possible addresses.

While this is a great improvement over IPv4, implementing IPv6 requires drastic infrastructure overhauls and is not a feasible short-term solution (all future references to IP will imply IPv4).

The more commonly adopted solution is to use the private IP addresses and translate these addresses to a public IP addresses for Internet connectivity. This is where Network Address Translation (NAT) and Network Address Port Translation (NAPT) come into play. These functions provide the mechanism to translate private IP addresses to public IP addresses for Internet connectivity.

There are two methods of performing address translation: NAT and NAPT.

NAT performs a 1-to-1-address mapping, for example:

| Internal IP | External IP |
|---|---|
| 10.10.108.70 | 65.24.212.70 |

NAT was developed solely for routing and security purposes where two or more IP addresses cannot be represented by a single network/subnet mask if they are not contiguous. This necessitates more than one route entry to describe the network. If the operator owns the contiguous space but does not wish to readdress the network they can use NAT to make the networks appear contiguous. This would allow the route entries to be compressed to a single subnet entry. Another use for NAT is hiding internal IP addresses. Since NAT provides translations on all private IP addresses, they will never be exposed to the outside world through the IP header. Some network operators use this as a security mechanism and can be called topology hiding.

The issue of address scarcity is addressed with NAPT. NAPT allows many private IP addresses to be represented as a single public IP address. Network owners must still own public IP addresses, but they can drastically reduce the number of public IP addresses they must own by using a NAPT device in their network. A NAPT device can typically be found where the private network is connected to a public router interface. A NAPT device usually is assigned with one or more public IP addresses. The NAPT device will use these public IP addresses to translate all of the private IP addresses.

Most IP traffic is in the form of request/response protocols, a client asks for some information and a server responds with the information in question. NAPT devices use this behavior for the address translation operation. The NAPT operation can be described as follows:

1. client sends request,
2. client request gets source IP address and port translated by NAPT device,
3. server responds to request by sending packets to IP address and port assigned by NAPT device.
4. NAPT device receives response and translates the destination IP address and port to the proper private IP address and port, and finally the client receives response and renders information to the user.

A NAPT device must provide translation for both the request and the response packets. A table is used to maintain the translation information. The NAPT translates the request packet and then stores the external IP and port combination used in the table. Response packets are then indexed against this table in order to find the actual internal IP address and port combination, for example:

| Src IP | Dst IP | Src Port | Dst Port | Ext IP | Ext Port |
|---|---|---|---|---|---|
| 10.10.108.80 | 12.14.128.71 | 40123 | 80 | 65.30.128.7 | 10022 |
| 10.10.108.71 | 212.24.30.12 | 10112 | 80 | 65.30.128.7 | 10023 |

Protocols that include IP address and port information in their message payloads can be adversely affected by the use of NAPT. There are several VoIP protocols that are designed with two main components: signaling and bearer. These protocols are H.323 and H.248, Media Gateway Control Protocol (MGCP) and Session Initiation Protocol (SIP). The signaling protocol is a separate session from the media, or voice, stream and includes in its payload (as opposed to its header) an IP address and port destination of where to send the media stream while the media (voice) will be carried using Real Time Protocol (RTP). Since most NAPT devices do not look at, much less alter, the contents of the IP payload, the indicated IP address and port for the media stream contained in a signaling packet will be ignored by the NAPT device and the media will not be able to pass through the device.

In addition to NAT/NAPT devices, Firewalls also present a problem for peer-to-peer communications such as VoIP. Firewalls provide security for computer networks by filtering out malicious traffic. There are two types of filtering methods: static rules that are called Access Control Lists (ACL), and request derived rules. A standard firewall will implicitly deny traffic. In order for a packet to cross a firewall it must match an allow rule in the firewalls filter rule set. The ACL is a user-provisioned rule that specifies the endpoints that are allowed to communicate. The following ACL shows two entries that could be provisioned to allow traffic between the indicated IP addresses:

| Src IP | Dst IP | Src Port | Dst Port |
|---|---|---|---|
| 65.24.212.70 | 212.24.30.12 | * | 5060 |
| 212.24.30.12 | 65.24.212.70 | 5060 | * |

Request derived rules are more explicit than ACL rules. A request-derived rule works in a similar manner as NAPT. The firewall has a trusted and un-trusted side (private and public side). These rules are generated by protocol requests that are initiated from the trusted side. A signature (IP address and port information) is stored in a table. Packets that arrive on the un-trusted side are assumed to be responses to requests. If a signature in the table corresponds to the packet, then the packet is assumed to be trusted and is allowed to cross the trust boundary. Each entry also contains a timestamp of the last activity. The signature will be removed from the table if the timestamp becomes older than a predefined amount of time (1-5 minutes).

Request derived rules present similar problems to those encountered with NAPT devices. Again, a network device makes the assumption that all traffic is client-server and will be initiated from a particular side of the device. With VoIP as a peer-to-peer protocol it will not work properly in this environment. A signaling packet, which originates from the un-trusted side, will not match a request-derived rule. ACL(s) can be used to manage inbound signaling, but scale issues can affect the manageability of such a solution and create a large security issue. The largest issue arises from the media that is sent from the un-trusted side of the network. The information that would be used to make a signature for this packet was contained in the payload of a signaling packet that crossed the firewall. Signatures are only generated on information in the header of the packet. Since the IP address and port information are encoded within the payload, a signature will never be created. ACL(s) cannot easily solve this problem, because the ports used for media traffic are dynamically assigned.

Often the functionality of the NAT/NAPT device and the firewall is combined into a single device that performs both functions. While the NAT/NAPT and firewall functionality may be described herein by reference to a single NAPT/firewall device, both the single combined-function device and the separate devices operating independently are interchangeable as far as the functionality described herein is concerned One attempt to overcome the issues with NAT devices and firewalls is disclosed in PCT application, International Publication Number WO 02/45373 A2, for Read. The proposed solution in Read uses a combination of an "external server" on the public side of the NAT/firewall and a "proxy interface agent" on the private side of the NAT/firewall. The proxy interface agent is used as a proxy for all peer-to-peer communications between an end terminal and the external server in public network, including both the signaling and real time media traffic. The proxy interface agent uses a multiplex connection with the external server to exchange the address and port information required to set up the real time media connections.

There are several problems with the proxy interface agent/external server arrangement used by Read. First, is the need for the proxy interface agent to act as a proxy for not only the signaling traffic, but also for the real time media traffic. The proxy interface agent is a software application residing on a general purpose server, or within the end terminal device itself. Requiring the proxy interface agent to process all of the real time media traffic introduces a very relevant amount of delay and potential congestion to a real time media stream that is very sensitive to not only the total amount of time required to traverse from source terminal to destination terminal, but also to the inter-arrival times between the packets making up the real time media stream. Excessive delays and variations in the inter-arrival times can cause quality problems such as excessive lag, drop-outs, and jitter.

Also, Read requires extensive connections between the terminal, the proxy interface agent and the external server to handle all of the control traffic between devices, signaling traffic for the communications, and real time media traffic. These complex connections require greater processor demands of the host platform, and increase the congestion, delay, and even worse, the likelihood of failure of the system. The overhead required by these complex and extensive connections is in addition to the processing time to proxy the traffic described above, and only increases the probability of quality problems with the real time media streams.

Finally, the Read system necessarily requires a complex device to act as its proxy interface agent. The proxy interface agent must be able to proxy one or more devices in real time communications as well as maintain complex communications with the external server. This complex device resides in the end user's network and must be purchased, maintained and serviced by the end user, usually an enterprise network administrator. This requires the network administrator to spend significant resources, both time and money, to implement the solution envisioned by Read.

Accordingly, what is needed is a NAT/firewall traversal system for peer-to-peer communication such as VoIP that minimizes delay and congestion for the real time media streams, simplifies communications across the NAT/firewall boundary and that minimizes the complexity of any devices residing on the private side of the NAT/firewall.

SUMMARY OF THE INVENTION

The present invention provides a simple solution to interconnect enterprise and service provider private and public networks that ensures open IP Communications without compromising network integrity. The system is comprised of a network processing system on the public side of the enterprise NAT/firewall and a traversal client on the private side of the enterprise NAT/firewall.

A secured connection is established between the network processing system and the traversal client. The secured connection is used by the traversal client to request services from the network processing system, and by the network processing system to send signaling information and instructions through the NAT/firewall. Because the secured connection is initiated from the private/trusted side and the packets do not contain IP address or port information in the payload, the connection can be established properly through a NAT/firewall. The network processing system allows media anchoring of peer-to-peer communications. All devices in the enterprise are configured to send and receive call setup information to or from one or more virtual IP addresses resident in the network processing system. This enables the network processing system to receive and forward all VoIP signaling messages.

The network processing system acts as an anchor point to coordinate routing of media and signaling packets, learn NAT bindings imposed by the enterprise firewall, and provide a means to secure and prioritize voice traffic across the service providers network. In order to implement media anchoring, the network processing system requires replacing IP addresses and ports embedded in the signaling messages with a virtual address and port managed by the network processing system.

The traversal client is a piece of software that can be installed on a server on the private side of the NAT, and the trusted side of the firewall within the enterprise network. The traversal client approach simplifies the enterprise model by eliminating the need for complex customer-provided equipment and works with the network processing system to receive signaling information from the public side of the NAT/firewall and by sending test packets, or spoof packets, through the firewall to open pinholes in the firewall and to provide the network processing system with NAPT information to allow proper routing of the media traffic.

The traversal client resident in the private network establishes a persistent; highly secure TCP connection with the network processing system in the service provider's network. The TCP connection is used by the network processing system to notify the traversal client of any incoming call. The notification includes the target IP address of the called party and an address reserved by the network processing system that will be used as a calling party address. The traversal client sends a ping packet to the calling party address via the network processing system with the source address set to the called party's IP address. The network processing system binds the called party to the dynamic address and port assigned by the enterprise firewall/NAT device. For outgoing calls, the network processing system learns the dynamic address and port assigned by the firewall to forward all signaling traffic to the calling party.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1A:
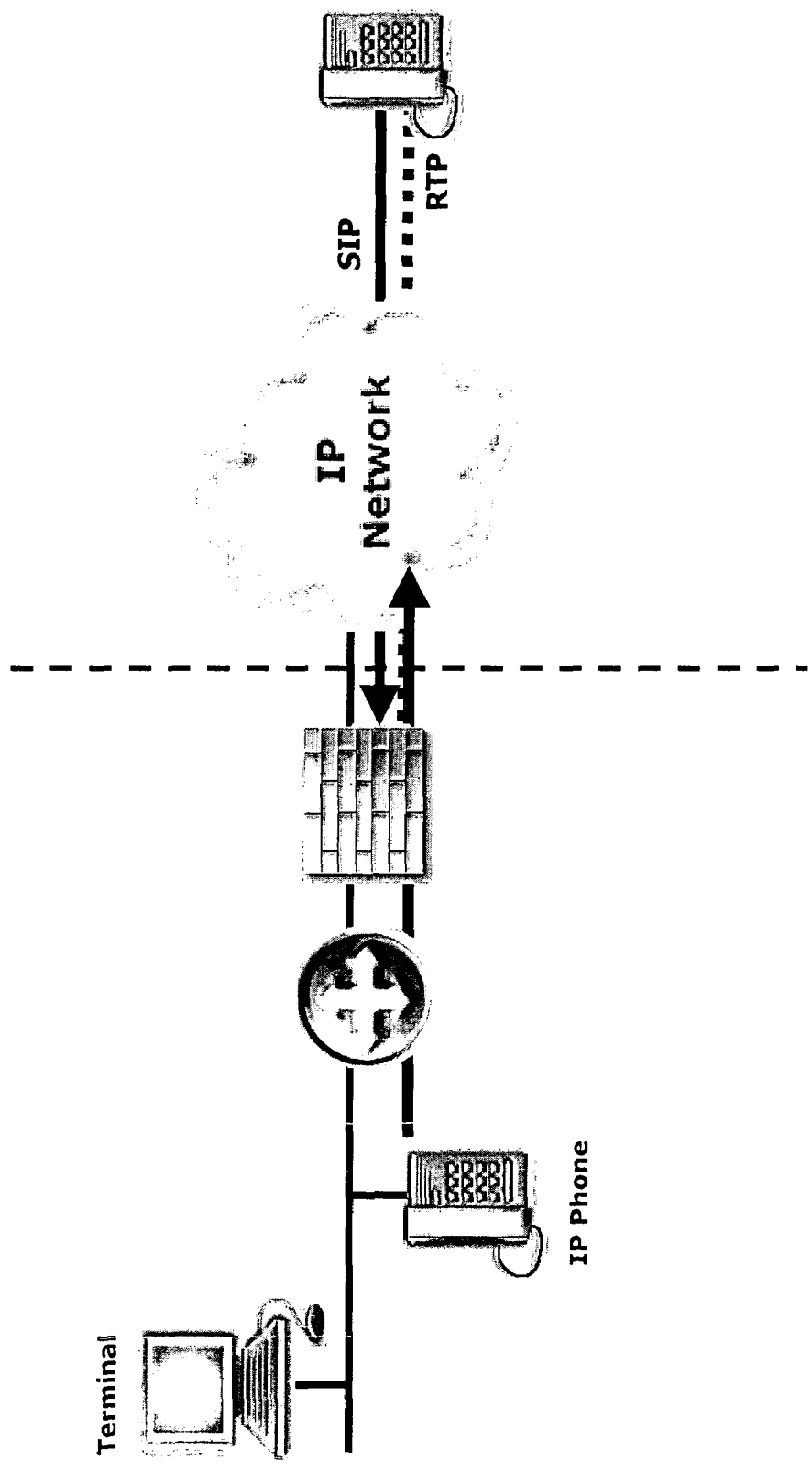
FIG. 1a is a simplified network diagram illustrating an example prior art network structure.

Referring now to FIG. 1a, a simplified network diagram is presented showing a prior art architecture 10 designed for request/response paradigm. As previously stated, the current network architecture is designed for a request/response paradigm. Terminals, or any type of network device that can originate or receive network traffic, on the private side of a NAT/firewall request information from the public network. The NAT/firewall is designed to take the destination port and address from the request and provision the NAT/firewall to allow traffic from that address and port to pass through. This allows for data on the public network that has been requested to enter the private side of the network, but not other unrequested data. Network architecture 10 illustrates this current architecture. Enterprise network 12 is connected to public network 26. Enterprise network 12 is comprised of devices, such as terminals 16 and phones 14, connected through network 18 to enterprise router 20. Enterprise router 20 connects to public network 26 through NAT/firewall 22.

While this architecture works well for the request/response traffic it was designed for, it presents problems for peer-to-peer traffic such as VoIP. When making a VoIP call, there are two main issues that arise with NAT/firewall devices such as NAT/firewall 22. The first problem occurs with the NAPT table entries when an incoming voice call from an phone on the public side of a NAT/firewall, such as VoIP call 34 from IP phone 28, is placed to an IP phone on the private side of a NAT/firewall device. Usually, a table entry is created after the NAPT device receives a request that originates from the private network side of the device, that entry will allow the response to the request to come back to the user. In VoIP however, the request can come from the public network side of the NAPT device (incoming call). When the device receives the address where the SIP packet needs to go to, it has no entry to match against, therefore it will be dropped. The inbound media traffic will have the same problem.

The second issue deals with private addresses present in signaling packets such as signaling traffic 32 from IP phone 14. The signaling packet that originates within the private side will contain a private IP address. Routers on the public IP network are not responsible for routing packets destined for the private IP addresses of private IP networks. Additionally, the addresses for the RTP media stream are buried in the payload of the signaling packet. The NAT/firewall device is unable to see these addresses and cannot provision itself to allow traffic from the outside phone. The RTP streams necessary to carry the voice call will, therefore, not be allowed through the NAT/firewall 22.

In order to address these problems the private IP address inside signaling packets must be recognized and provisioned for and a way for creating table entries for calls coming from the public side of the NAPT device must enabled.

Figure 1B:
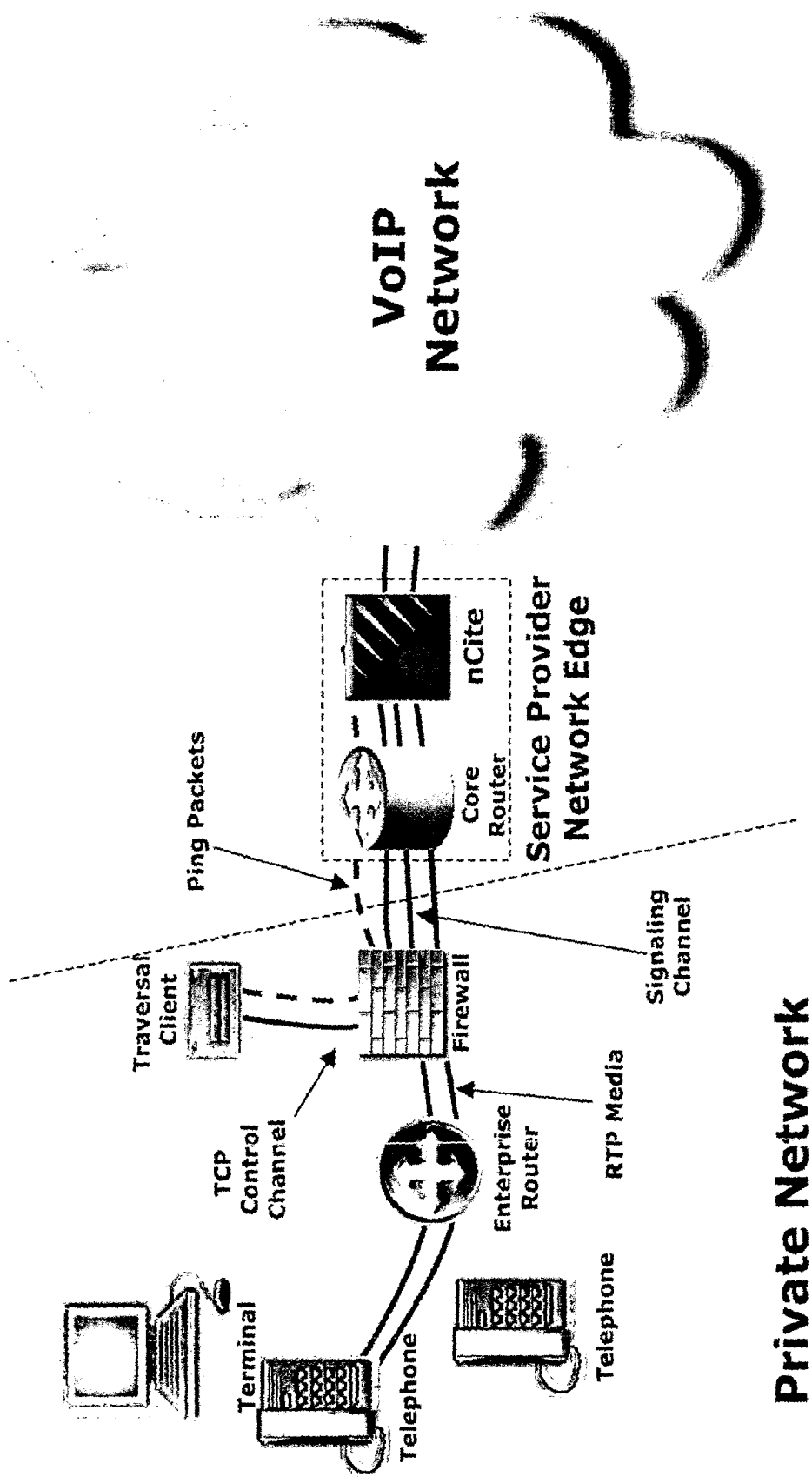
FIG. 1b is a simplified network diagram illustrating a network structure implementing the network traversal client and network processing system according to the present invention.

Referring now to FIG. 1b, a network architecture 30 that allows peer-to-peer communications across NAT/firewall boundaries is shown. The existing network architecture is still present with the enterprise network 12, consisting of terminals 16 and phones 14 connected to enterprise router 20 which communicates with network 26 using edge router 24 in the service provider's network through NAT/firewall 22. The present invention adds two new pieces of equipment. First, a network processing system 38 is placed at the edge of the service provider network in communication with edge router 24, and second, a traversal client 36 is placed in the enterprise on the private side of NAT/firewall 22.

The network processing system 38 resides in the service provider's network. Upon initialization, the network processing system 38 and traversal client 36 will establish a secure connection, which could be a TCP/IP connection under the secure socket layer (SSL) protocol. The traversal client 36 and the network processing system 38 use this secure connection to communicate across the NAT/firewall boundary. Because the secure connection is initiated from the private/trusted side 11 of the NAT/firewall boundary using traversal client 36 and the packets do not contain IP address or port information in the payload of the packet, the connection can be established properly through a standard NAT/firewall to the public side 13.

The network processing system 38 is used to implement a form of media anchoring. The network processing system 38 maps all external proxies or call agents with a virtual IP address assigned to network processing system 38. All call receiving and initiating devices in the enterprise are configured to send and receive call setup information to or from one or more of these virtual IP addresses. This enables network processing system 38 to receive and forward all VoIP signaling messages for the call receiving and initiating devices.

The network processing system 38 acts as an anchor point to coordinate routing of media and signaling packets, learn NAT bindings imposed by the enterprise firewall, and provide a means to secure and prioritize voice traffic across the service providers network. In order to implement media anchoring, network processing system 38 replaces IP addresses and ports embedded in the signaling messages with a virtual address and port managed by network processing system 38.

Traversal client 36 is a software agent running on a general purpose server that resides in the enterprise network and is installed behind enterprise NAT/firewall 22. Traversal client 36 is installed on a standard server such as one that runs any of the Windows, Linux, or Solaris Operating Systems and must be installed on the private/trusted side of a NAT/firewall 22. The traversal client of the present invention simplifies the enterprise requirements by eliminating the need for complex customer-provided equipment or software. The traversal client is able to work transparently with the existing software-based or hardware-based firewall/NAT devices.

As stated, the traversal client 36 resident in the private network establishes a persistent, highly secure connection 35 with the network processing system 38 in the service provider's network. Unlike other proposed solutions, traversal client 36 does not act as a proxy for any of the signaling 31 or media 33 traffic between enterprise terminals 16 or phones 4 and an external terminal or phone connected to network 26. By not acting as a proxy for the enterprise devices, traversal client 36 needs only to establish secure connection 35 with network processing system 38. This allows traversal client 36 to be kept very simple and prevents traversal client 36 from introducing any significant delay in the media 33 traffic, as well as reducing the expertise and maintenance efforts required by the network administrators in the enterprise. Instead the intelligence and complexity is implemented in the network processing system 38, which resides in the service provider, who is better able to install, and maintain any complexity in the network.

For incoming calls, secure connection 35 is used by the network processing system 38 to notify the traversal client 36 of any incoming call from the public side of NAT/firewall 22. The notification includes the target IP address of the called party and an address reserved by the network processing system 38 that will be used as a calling party address. Traversal client 36 then sends a ping, or spoof packet, 37 to the calling party address via the network processing system 38 with the source address set to the called party's IP address. Network processing system 38 then binds the called party to the dynamic address and port assigned by the enterprise firewall/NAT 22. For outgoing calls, network processing system 38 learns the dynamic address and port assigned by the firewall to forward all signaling traffic to the calling party.

To further ensure security, the private network administrator can use the following mechanisms. The traversal client 36 can only send packets to and receive packets from specific ports on the external network processing system 38. Further, network processing system 38 will send a message to traversal client 36 whenever it receives a unauthorized ping packet. The traversal client 36 then closes the secure connection to network processing system 38 and triggers an alarm. Since the traversal client 36 can only send ping packets out to the network processing system 38, this ensures detection of a security leak.

Figure 2:
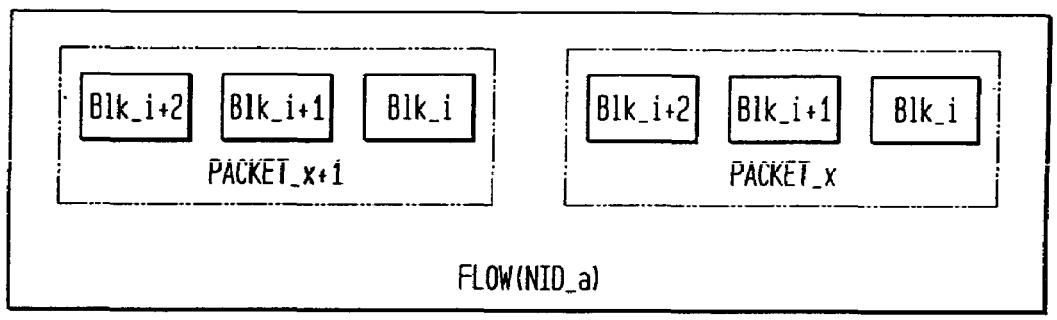
FIG. 2 is a diagram illustrating flow, packet and block concepts used in the present invention.
Figure 2:
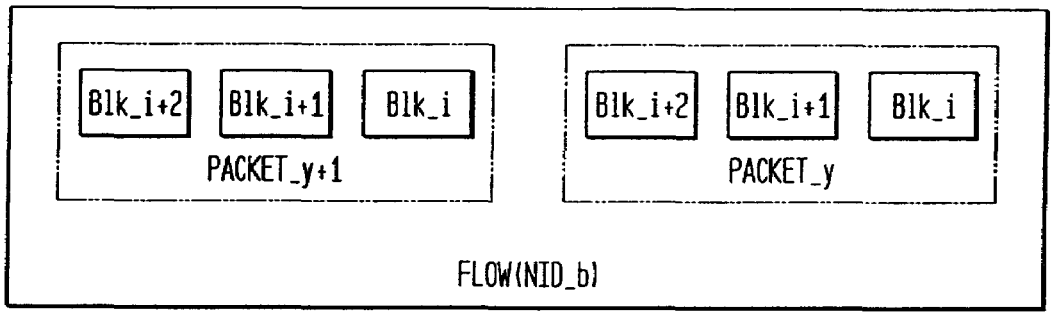
Figure 2:
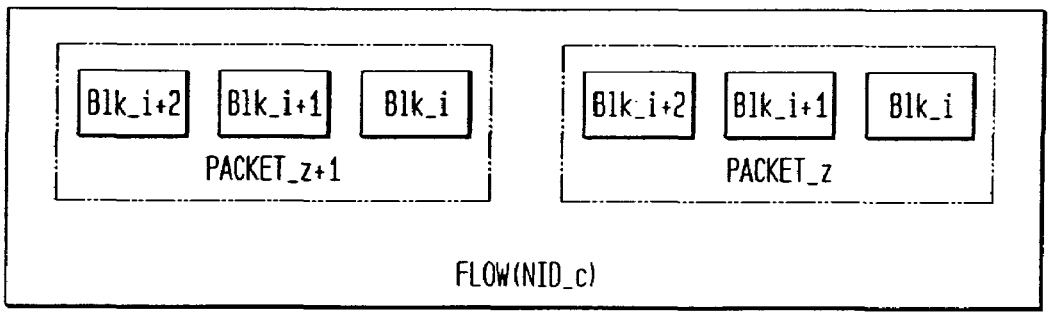

In order to help understand the operation of the network processing system described herein, FIG. 2 is provided to illustrate concepts relating to network traffic that will be used extensively herein. FIG. 2 shows three individual flows, Flow (NID_a), Flow (NID_b), and Flow (NID_c), which can be simultaneously present on the network. Each flow represents an individual session that exists on the network. These sessions can be real-time streaming video sessions, voice over IP (VoIP) call, web-browsing, file transfers, or any other network traffic. Each flow is made up of individual data packets, packets x and x+1 for Flow (NID_a), packets y and y+1 for Flow (NID_b) and packets z and z+1 for Flow (NID_c).

While two packets are shown, each flow is made up of an arbitrary number of packets, and each packet is of an arbitrary size. Each packet can further be broken down into fixed length blocks shown for each packet as Blk_i, Blk_i+1, and Blk_i+2. While packets and flows appear as network traffic, the fixed length blocks shown in FIG. 2 are created by the network processing system of the present invention, and will be described with greater detail below.

Figure 3:
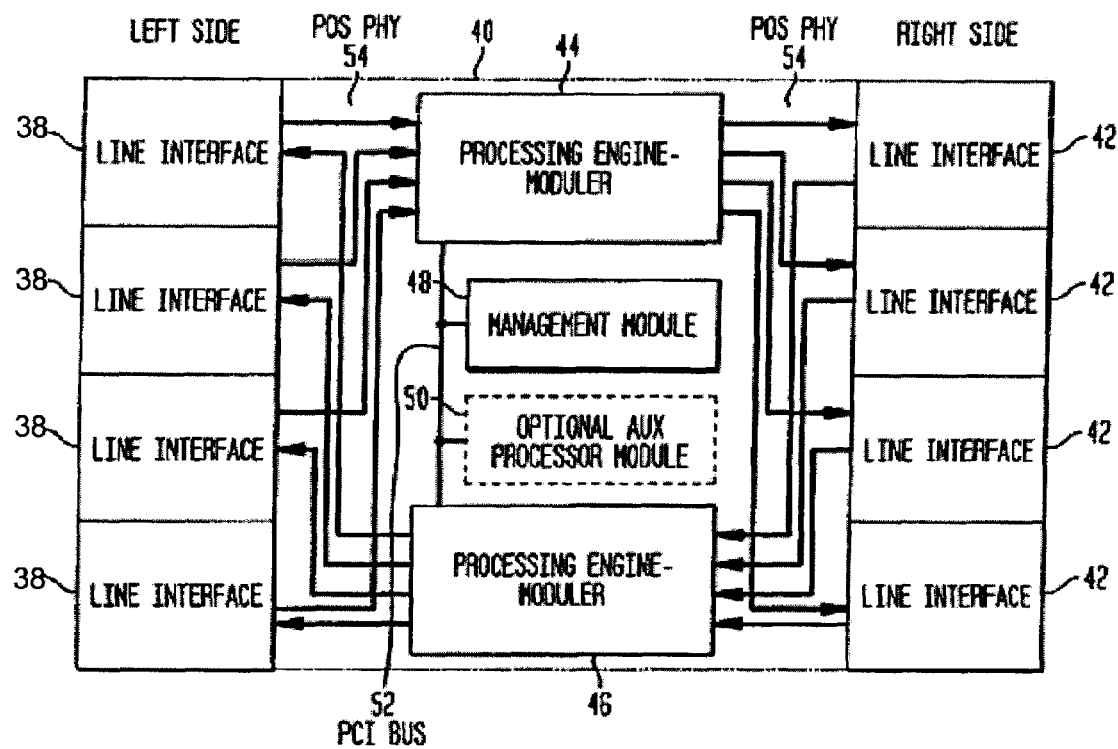
FIG. 3 is a block diagram of a network processing system according to the present invention.

Referring now to FIG. 3, one embodiment of a network processing system according to the present invention is shown. Network processing system 40 is a bi-directional system that can process information from either right line interfaces 42, which is then transmitted back onto the network through left line interfaces 38, or from left line interfaces 38, which is then transmitted back onto the network through right lines interfaces 42. Both left and right line interfaces 38 and 42 respectively, can consist of any plurality of ports, and can accept any number of network speeds and protocols, including such high speeds as OC-3, OC-12, OC-48, and protocols including 10/100 Ethernet, gigabit Ethernet, and SONET.

Figure 4:
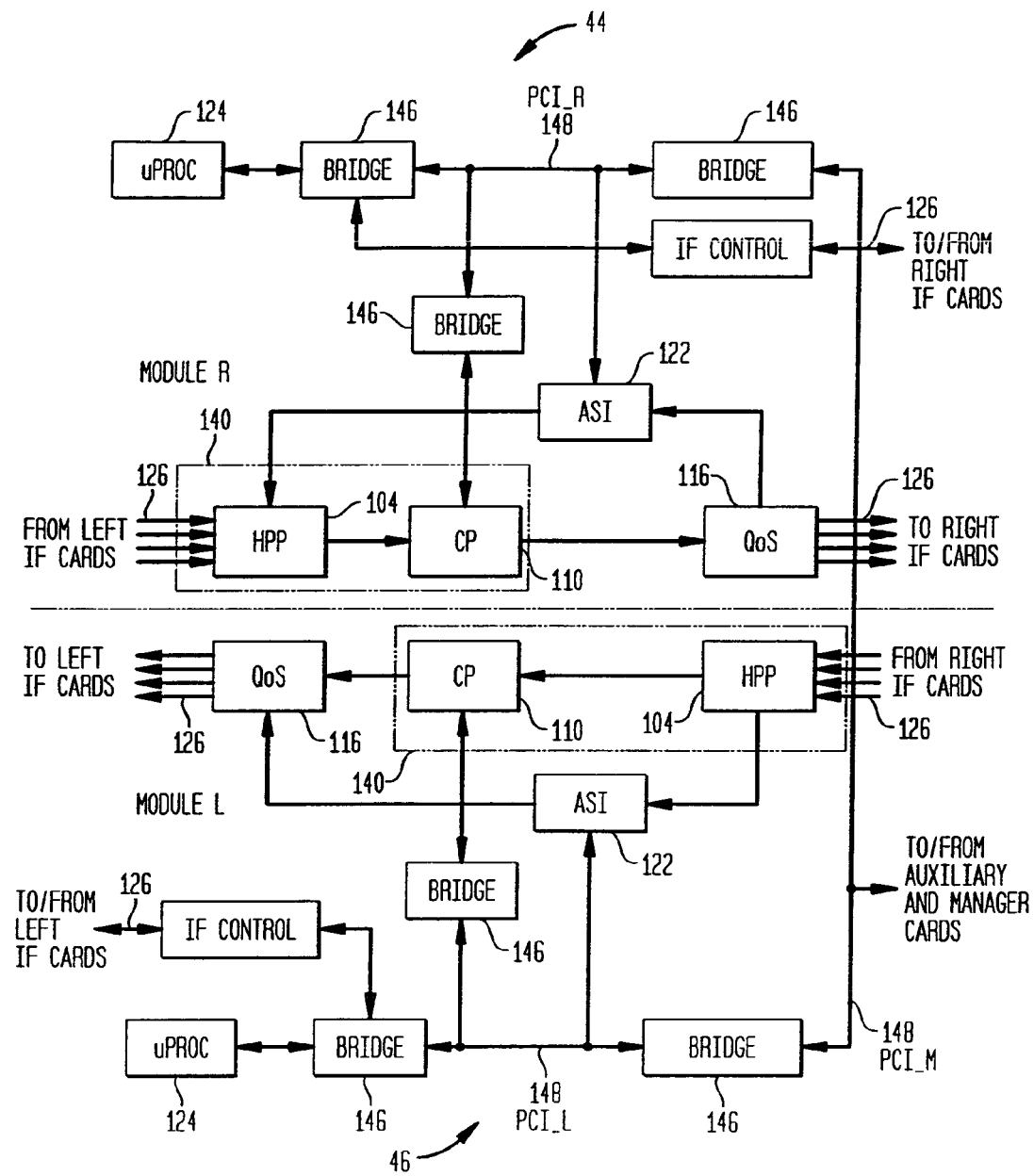
FIG. 4 is a block diagram of the processing engines shown in FIG. 3.

The line interface cards take the incoming data in the form of packets and place the data on a data bus 54 which is preferably an industry standard data bus such as a POS-PHY Level 3, or an ATM UTOPIA Level 3 type data bus. Data received on left line interfaces 38 is sent to learning state machine, or processing engine 44, while data received on right line interfaces 42 is sent to learning state machine, or processing engine 46. While network processing system 40 is bi-directional, individual learning state machines 44 and 46 within network processing system 40 are unidirectional, requiring two to process bi-directional information. Each learning state machine 44 and 46, the operation of which will be described in greater detail with reference to FIG. 4, is operable to scan the contents of each data packet, associate the data packet with a particular flow, determine the treatment for each data packet based on its contents and any state for the associated flow, and queue and modify the data packet to conform to the determined treatment. The state for flows is the information related to that flow that has been identified by network processing system 40 from packets associated with the flow that have already been processed.

An internal bus 52, which is preferably a PCI bus, is used to allow learning state machines 44 and 46 to communicate with each other, and to allow management module 48 and optional auxiliary processor module 50 to communicate with both learning state machines 44 and 46. Intercommunication between learning state machines 44 and 46 allows the processing engines to exchange information learned from a flow that can be applied to the treatment for the return flow. For example, treatment for a high-priority customer needs to be applied to both outgoing and incoming information. Since each learning state machine is unidirectional, to affect both directions of traffic, information must be shared between learning state machines.

Management module 48 is used to control the operation of each of the learning state machines 44 and 46, and to communicate with external devices which are used to load network processing system 40 with policy, QoS, and treatment instructions that network processing system 40 applies to the network traffic it processes.

Referring now to FIG. 4, one embodiment of a content processing engine used in the network processing system according to the present invention is shown. Each of the learning state machines 44 and 46 are identical as discussed, and the operation of each will be discussed generally and any description of the operation of the processing engines will apply equally to both learning state machines 44 and 46. Line interface cards 42 and 38, shown in FIG. 3, take the data from the physical ports, frames the data, and then formats the data for placement on fast-path data bus 126 which, as described, is preferably an industry standard data bus such as a POS-PHY Level 3, or an ATM UTOPIA Level 3 type data bus.

Fast-path data bus 126 feeds the data to traffic flow scanning processor 140, which includes header preprocessor 104 and content processor 110. The data is first sent to header preprocessor 104, which is operable to perform several operations using information contained in the data packet headers. Header preprocessor 104 stores the received data packets in a packet storage memory associated with header preprocessor 104, and scans the header information. The header information is scanned to identify the type, or protocol, of the data packet, which is used to determine routing information and to decode the IP header starting byte. As will be discussed below, the learning state machine, in order to function properly, needs to reorder out of order data packets and reassemble data packet fragments. Header preprocessor 104 is operable to perform the assembly of asynchronous transfer mode (ATM) cells into complete data packets (PDUs), which could include the stripping of ATM header information.

After data packets have been processed by header preprocessor 104 the data packets, and any conclusion formed by the header preprocessor, such as QoS information, are sent on fast-data path 126 to the other half of traffic flow scanning engine 140, content processor 110. The received packets are stored in packet storage memory (not shown) while they are processed by content processor 110. Content processor 110 is operable to scan the contents of data packets received from header preprocessor 104, including the entire payload contents of the data packets. The header is scanned as well, one goal of which is to create a session id using predetermined attributes of the data packet.

In the preferred embodiment, a session id is created using session information consisting of the source address, destination address, source port, destination port and protocol, although one skilled in the art would understand that a session id could be created using any subset of fields listed, or any additional fields in the data packet, without departing from the scope of the present invention. When a data packet is received that has new session information the header preprocessor creates a unique session id to identify that particular traffic flow. Each successive data packet with the same session information is assigned the same session id to identify each packet within that flow. Session ids are retired when the particular traffic flow is ended through an explicit action, or when the traffic flow times out, meaning that a data packet for that traffic flow has not been received within a predetermined amount of time. While the session id is discussed herein as being created by the header preprocessor 104, the session id can be created anywhere in traffic flow scanning engine 140 including in content processor 110.

The contents of any or all data packets are compared to a database of known signatures, and if the contents of a data packet, or packets, match a known signature, an action associated with that signature and/or session id can be taken by the processing engine. Additionally, content processor 110 is operable to maintain state awareness throughout each individual traffic flow. In other words, content processor 110 maintains a database for each session which stores state information related to not only the current data packets from a traffic flow, but state information related to the entirety of the traffic flow. This allows network processing system 40 to act not only based on the content of the data packets being scanned but also based on the contents of the entire traffic flow. The specific operation of content processor 110 will be described with reference to FIG. 5.

Once the contents of the packets have been scanned and a conclusion reached by traffic flow scanning engine 140, the packets and the associated conclusions of either or both the header preprocessor 104 and the content processor 110 are sent to quality of service (QoS) processor 116. QoS processor 116 again stores the packets in its own packet storage memory for forwarding. QoS processor 116 is operable to perform the traffic flow management for the stream of data packets processed by network processing system 40. QoS processor contains engines for traffic management, traffic shaping and packet modification.

QoS processor 116 takes the conclusion of either or both of header preprocessor 104 and content processor 110 and assigns the data packet to one of its internal quality of service queues based on the conclusion. The quality of service queues can be assigned priority relative to one another, or can be assigned a maximum or minimum percentage of the traffic flow through the device. This allows QoS processor 116 to assign the necessary bandwidth to traffic flows such as VoIP, video and other flows with high quality and reliability requirements, while assigning remaining bandwidth to traffic flows with low quality requirements such as email and general web surfing to low priority queues. Information in queues that do not have the available bandwidth to transmit all the data currently residing in the queue according to the QoS engine is selectively discarded, thereby removing that data from the traffic flow.

The quality of service queues also allow network processing system 40 to manage network attacks such as denial of service (DoS) attacks. Network processing system 40 can act to qualify traffic flows by scanning the contents of the packets and verifying that the contents contain valid network traffic between known sources and destinations. Traffic flows that have not been verified because they are from unknown sources, or because they are new unclassified flows, can be assigned to a low quality of service queue until the sources are verified or the traffic flow is classified as valid traffic. Since most DoS attacks send either new session information, data from spoofed sources, or meaningless data, network processing system 40 would assign those traffic flows to low quality traffic queues. This ensures that the DoS traffic would receive no more than a small percentage (i.e. 5%) of the available bandwidth, thereby preventing the attacker from flooding downstream network equipment.

The QoS queues in QoS processor 116 (there are 64 k queues in the present embodiment of the QoS processor, although any number of queues could be used) feed into schedulers (1024 in the present embodiment), which feed into logic ports (256 in the present embodiment), which send the data to flow control port managers (32 in the present embodiment) which can correspond to physical egress ports for the network device. The traffic management engine and the traffic shaping engine determine the operation of the schedulers and logic ports in order to maintain traffic flow in accordance with the programmed parameters.

QoS processor 116 also includes a packet modification engine, which is operable to modify, add, or delete bits in any of the fields of a data packet. This allows QoS processor 116 to change DiffServ bits, or to place the appropriate MPLS shims on the data packets for the required treatment. The packet modification engine in QoS processor 116 can also be used to change information within the payload itself if necessary. Data packets are then sent along fast-data path 126 to output to the associated line interfaces, where it is converted back into an analog signal and placed on the network.

As with all network equipment, a certain amount of network traffic will not be able to be processed along fast-data path 126. This traffic will need to be processed by on-board microprocessor 124. The fast-path traffic flow scanning engine 140 and QoS processor 116 send packets requiring additional processing to flow management processor 122, which forwards them to microprocessor 124 for processing. The microprocessor 124 then communicates back to traffic flow scanning engine 140 and QoS processor 116 through flow management processor 122. Flow management processor 122 is also operable to collect data and statistics on the nature of the traffic flow through the processing engine 40. Bridges 146 are used between elements to act as buffers on PCI buses 148 in order to prevent the loss of data that could occur during a flood of the PCI bus.

As can be seen from the description of FIG. 4, learning state machines 44 and 46 allow the entire contents of any or all data packets received to be scanned against a database of known signatures. The scanned contents can be any variable or arbitrary length and can even cross packet boundaries. The abilities of learning state machines 44 and 46 allow the construction of a network device that is intelligent and state-aware, and gives the network device the ability to operate on data packets based not only on the contents of that data packet, but also on the contents of previous data packets from the same flow.

Figure 5:
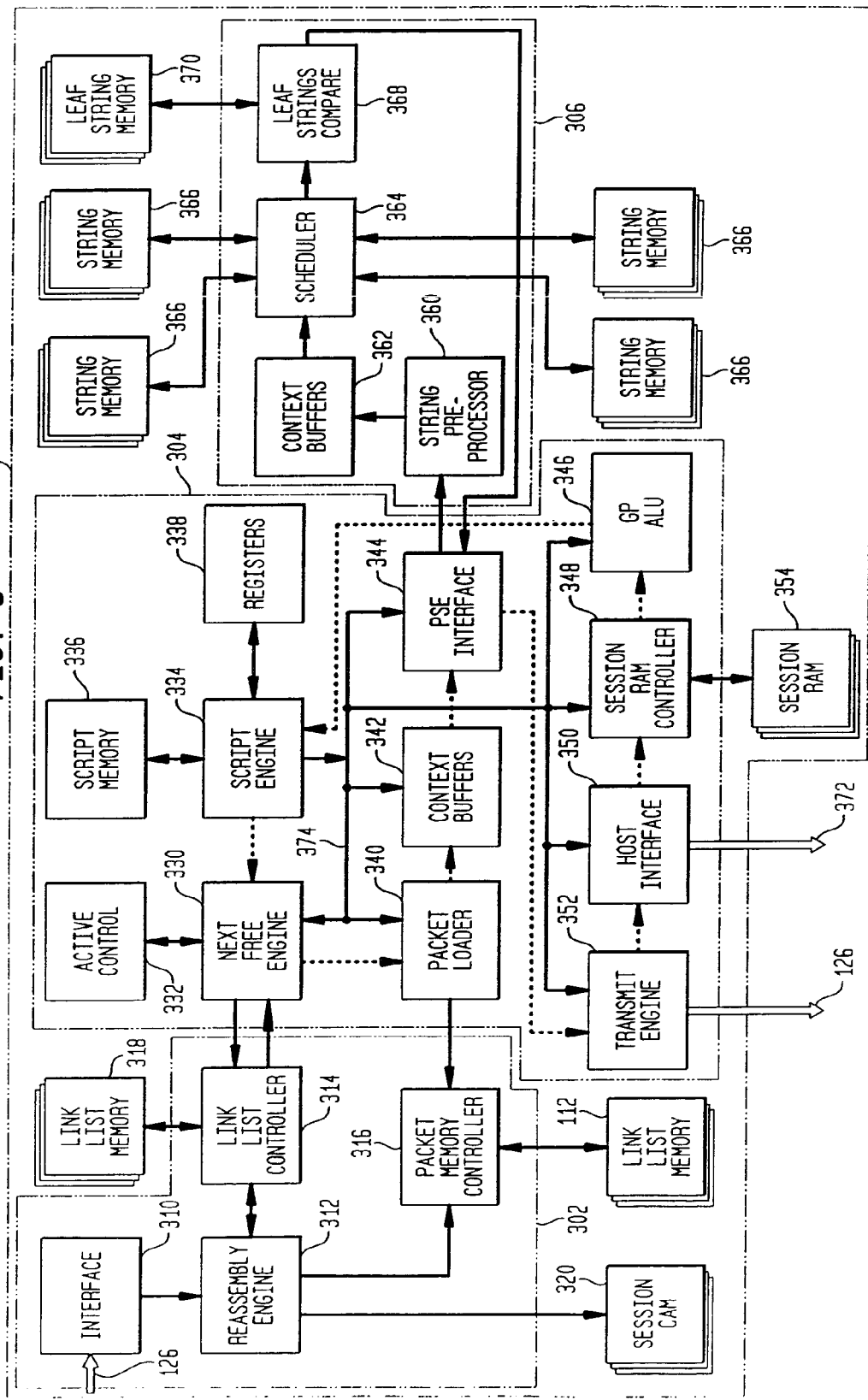
FIG. 5 is a block diagram of the content processor from FIG. 4.

Referring now to FIG. 5, the content processor 110 of FIG. 4 is described in greater detail. As described above, content processor 110 is operable to scan the contents of data packets forwarded from header preprocessor 104 from FIG. 4. Content processor 110 includes three separate engines, queue engine 302, context engine 304, and content scanning engine 306.

Since content processor 110 scans the contents of the payload, and is able to scan across packet boundaries, content processor 110 must be able to reassemble fragmented packets and reorder out of order packets on a per session basis. Reordering and reassembling is the function of queue engine 302. Queue engine 302 receives data off the fast-path data bus 127 using fast-path interface 310. Packets are then sent to packet reorder and reassembly engine 312, which uses packet memory controller 316 to store the packets into packet memory 112. Reordering and reassembly engine 312 also uses link list controller 314 and link list memory 318 to develop detailed link lists that are used to order the data packets for processing. The data packets are broken into 256 byte blocks for storage within the queue engine 302. Session CAM 320 can store the session id generated by queue engine 302 of content processor 110. Reordering and reassembly engine 312 uses the session id to link data packets belonging to the same data flow.

In order to obtain the high throughput speeds required, content processor 110 must be able to process packets from multiple sessions simultaneously. Content processor 110 processes blocks of data from multiple data packets each belonging to a unique traffic flow having an associated session id. In the preferred embodiment of the present invention, context engine 304 of content processor 110 processes 64 byte blocks of 64 different data packets from unique traffic flows simultaneously. Each of the 64 byte blocks of the 64 different data flows represents a single context for the content processor. The scheduling and management of all the simultaneous contexts for content processor 110 is handled by context engine 304.

Context engine 304 works with queue engine 302 to select a new context when a context has finished processing and has been transmitted out of content processor 110. Next free context/next free block engine 330 communicates with link list controller 314 to identify the next block of a data packet to process. Since content processor 110 must scan data packets in order, only one data packet or traffic flow with a particular session id can be active at one time. Active control list 332 keeps a list of session ids with active contexts and checks new contexts against the active list to insure that the new context is from an inactive session id. When a new context has been identified, packet loader 340 uses the link list information retrieved by the next free context/next free block engine 330 to retrieve the required block of data from packet memory 112 using packet memory controller 316. The new data block is then loaded into a free buffer from context buffers 342 where it waits to be retrieved by content scanning engine interface 344.

Content scanning engine interface 344 is the interface between context engine 304 and content scanning engine 306. When content scanning engine 306 has room for a new context to be scanned, content scanning engine interface 344 sends a new context to string preprocessor 360 in content scanning engine 306. String preprocessor 360 is operable to simplify the context by performing operations such as compressing white space (i.e. spaces, tabs, returns) into a single space to simplify scanning. Once string preprocessor 360 has finished, the context is loaded into one of the buffers in context buffers 362 until it is retrieved by string compare 364. String compare 364 controls the input and output to signature memory 366. While four signature memories 366, each of which is potentially capable of handling multiple contexts, are shown any number could be used to increase or decrease the throughput through content scanning engine 110. In the present embodiment, each of the signature memories 366 is capable of processing four contexts at one time.

One of the signature memories 366 is assigned the context by scheduler 364 and then compares the significant bits of the context to the database of known strings that reside in signature memory 366. The signature memory 366 determines whether there is a potential match between the context and one of the known signatures using significant bits, which are those bits that are unique to a particular signature. If there is a potential match, the context and the potentially matched string are sent to leaf string compare 368 which uses leaf string memories 370 to perform a bit to bit comparison of the context and the potentially matched string. Although four string memories 366 and two leaf string memories 370 are shown, any number of string memories 366 and leaf string memories 370 can be used in order to optimize the throughput of content processor 110.

The conclusion of the content scanning are then sent back to the payload scanning interface 344 along with possibly a request for new data to be scanned. The conclusion of the content scanning can be any of a number of possible conclusions. The scanning may not have reached a conclusion yet and may need additional data from a new data packet to continue scanning in which case the state of the traffic flow, which can be referred to as an intermediate state, and any incomplete scans are stored in session memory 354 along with other appropriate information such as sequence numbers, counters, etc. The conclusion reached by signature memory 366 may also be that scanning is complete and there is or isn't a match, in which case the data packet and the conclusion are sent to transmit engine 352 for passing to QoS processor 116 from FIG. 4. The scanning could also determine that the data packet needs to be forwarded to microprocessor 124 from FIG. 4 for further processing, so that the data packet is sent to host interface 350 and placed on host interface bus 372. In addition to handling odd packets, host interface 350 allows microprocessor 124 to control any aspect of the operation of content processor 110 by letting microprocessor 124 write to any buffer or register in context engine 304.

State information is stored in session memory 354 and is updated as necessary after data associated with the particular traffic flow is scanned. The state could be an intermediate state, representing that the matching is incomplete and additional data is needed to continue the scanning. Also, the state could be a partial state indicating that one or more events have occurred from a plurality of events required to generate a particular conclusion. The state may be a final state indicating that a final conclusion has been reached for the associated traffic flow and no further scanning is necessary. Or, the state may represent any other condition required or programmed into the content processor 110. The state information for each traffic flow, in whatever form, represents the intelligence of network processing system 40 from FIG. 3, and allows the network processing system to act not only on the information scanned, but also on all the information that has been previously scanned for each traffic flow.

The operation of transmit engine 352, host interface 350, session memory controller 348, which controls the use of session memory 354, and of general-purpose arithmetic logic unit (GP ALU) 346, which is used to increment or decrement counters, move pointers, etc., is controlled by script engine 334. Script engine 334 operates to execute programmable scripts stored in script memory 336 using registers 338 as necessary. Script engine 334 uses control bus 374 to send instruction to any of the elements in context engine 304. Script engine 334 or other engines within content processor 110 have the ability to modify the contents of the data packets scanned.

The abilities of content processor 110 are unique in a number of respects. Content processor 110 has the ability to scan the contents of any data packet or packets for any information that can be represented as a signature or series of signatures. The signatures can be of any arbitrary length, can begin and end anywhere within the packets and can cross packet boundaries. Further, content processor 110 is able to maintain state awareness throughout all of the individual traffic flows by storing state information for each traffic flow representing any or all signatures matched during the course of that traffic flow. Existing network processors operate by looking for fixed length information at a precise point within each data packet and cannot look across packet boundaries. By only being able to look at fixed length information at precise points in a packet, existing network processors are limited to acting on information contained at an identifiable location within some level of the packet headers and cannot look into the payload of a data packet much less make decisions on state information for the entire traffic flow or even on the contents of the data packet including the payload.

The software associated with the traversal client described with respect to FIG. 1b is implemented using the microprocessor on the management module 48 from FIG. 3. The traffic associated with traversal client 36 from FIG. 1b is received by the appropriate line interface 42 or 44 and sent to the corresponding processing engine 44 or 46, where it is recognized and pulled from the fast-path. The traffic is then sent to management module 48 where it is processed and the appropriate steps are taken as discussed with reference to FIG. 1b and FIGS. 6 and 7 below.

Figure 6:
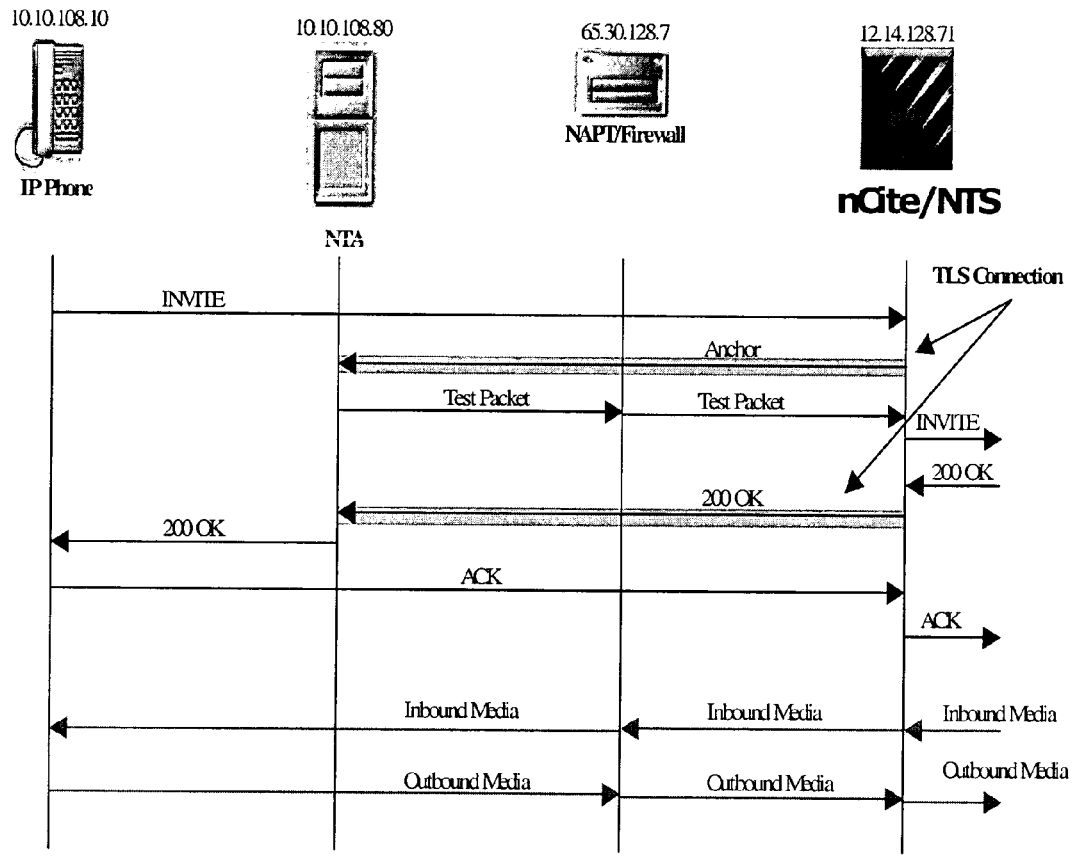
FIG. 6 is a signaling diagram showing an outbound VoIP call according to the present invention.

Referring now to FIG. 6, a signaling diagram showing an outbound VoIP call in accordance with the present invention is shown. Each signal, message or session is shown by an arrow with the beginning of the arrow representing the source of the signal, message, or session and the head of the arrow representing the destination of the signal, message or session.

The initial request is sent from the private/trusted side of the network. The network processing system will receive this message because it is functioning as the outbound proxy for this SIP network. The INVITE will contain a Session Description Protocol (SDP) parameter that specifies the address and port that the IP phone will use to receive media traffic.

The NAT/firewall device creates two problems for this SDP parameter. First, the address and port expressed are private. The SDP parameter will have little meaning on the public side of the network. Second, there is no request-derived rule in the firewall that would allow any packets that might match the media signature to enter the network.

The network processing system 38 from FIG. 1*b* recognizes this problem and performs the following actions:

a) The network processing system will identify the customer associated with the INVITE (one network processing system can service multiple enterprises, meaning there will be many secured connections to multiple traversal clients 36).

b) The network processing system will send an anchor command down the appropriate secured connection. The network processing system includes the private IP address and port learned from the SDP parameters and a public IP address and port reserved on the network processing system in the Anchor command.

c) The traversal client uses this information to send a Test Packet (also referred to as a spoof packet). The Test Packet has its source IP address and source port formatted to look like the SDP parameters. The destination IP address and destination port are formatted to the reserved public IP address and port on the network processing system.

d) This Test Packet causes the NAT/firewall to perform a translation on the source information, and create a table entry for the packet in the NAT/firewall.

e) The firewall will insert a request-derived rule to match the signature of any packets that might be a response to the Test Packet.

f) The network processing system can learn the NAPT mapping used by examining the actual source information on the Test Packet. The network processing system will then rewrite the SDP parameters in the INVITE with an IP address and port reserved in the network processing system, before forwarding the request. The network processing system will make its own NAPT table entry that will allow media packets to be sent to the network processing system, which will then forward the packets to the NAT/firewall. At this point any packets sent from the network processing system IP address and port to the IP address and port learned from the Test Packet will be translated and forwarded to the IP address and port indicated in the SDP parameters.

All inbound signaling (SIP) messages are transported on the secured connection. The traversal client will place these packets on the enterprise network, while preserving their actual source IP address and port (the network processing system's address). In the scenario in FIG. 6, the 200 response will be sent to the enterprise over the secured connection. The ACK will follow the Route set that was built from the Record-Route list in the 200 response. The Route set will cause the ACK to be sent to the network processing system, which will proxy the message to the next entry in the Route set. The outbound media will reach its destination. The media will be sent from the trusted to the un-trusted side, and the receiving address is the public IP address of the network processing system. When the network processing system receives the outbound media stream it will again proxy the packets to the appropriate destination learned from the original SDP in the 200 response. The network processing system will proxy the inbound media stream to the learned IP address and port for the call. The NAT/firewall will then forward the media stream to the correct IP phone.

Figure 7:
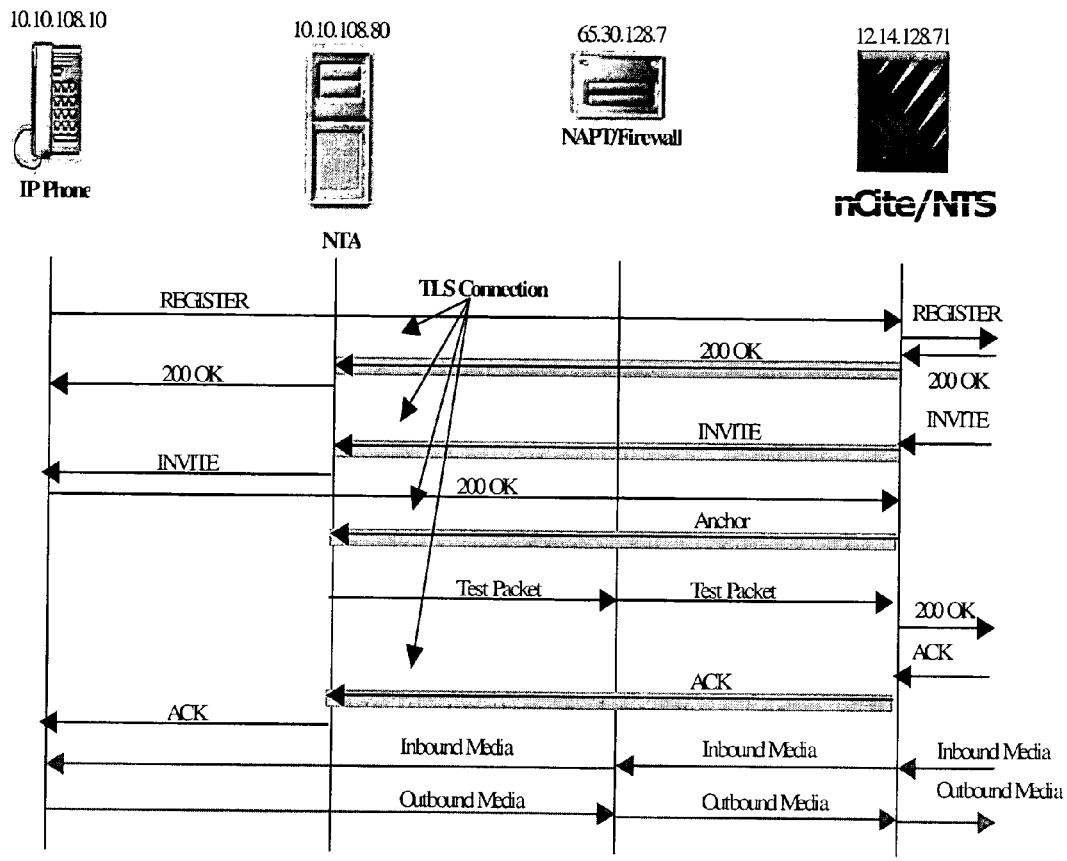
FIG. 7 is a signaling diagram showing an inbound VoIP call according to the present invention.

Referring now to FIG. 7, a signaling diagram showing an inbound VoIP call in accordance with the present invention is shown. As in FIG. 6, each signal, message or session is shown by an arrow with the beginning of the arrow representing the source of the signal, message, or session and the head of the arrow representing the destination of the signal, message or session.

This scenario introduces one new process to the previous call flow example. When a device wishes to place a call into the enterprise network it must know the IP address and port that the desired IP phone is using. Since the IP phone is behind a NAT/firewall the IP address and port are private, and they cannot be reached from the un-trusted side.

The traversal protocol will use the secured connection to route the INVITE from the nCite to the enterprise network. This allows the signaling through the firewall section, but the bigger problem arises when discovering the private IP address of the IP phone where the INVITE must be routed. The private address can always be statically provisioned, but static addressing is complicated to manage, does not scale well (on the carrier and enterprise side), and eliminates some of the key features of VoIP. In order to support dynamic private addressing, the IP phones must support the SIP REGISTER method. REGISTER provides a mechanism to learn the current address of a particular global name (i.e. sip:+12145551000, 10.10.108.10). In this scenario the IP phones will again use the network processing system 38 from FIG. 1*b* as the outbound proxy, which forces all SIP requests through the network processing system.

The phones will register with a Registrar behind the network processing system within the carrier network, and then the network processing system will modify the required fields within the REGISTER request. The Contact header, which specifies the current address being used by the phone, will be modified to an IP address and port pair managed by the network processing system. The old value of the Contact header will be stored for use with routing INVITE(s) associated with this registration. When the network processing system receives the INVITE to an IP address and port that was modified in a registration it can lookup the private IP address and port of the destination IP phone. The network processing system can then place the INVITE on the correct secured connection, which will result in the proper IP phone being contacted. The rest of the call flow works exactly as the outbound example discussed with reference to FIG. 6.

Figure 8:
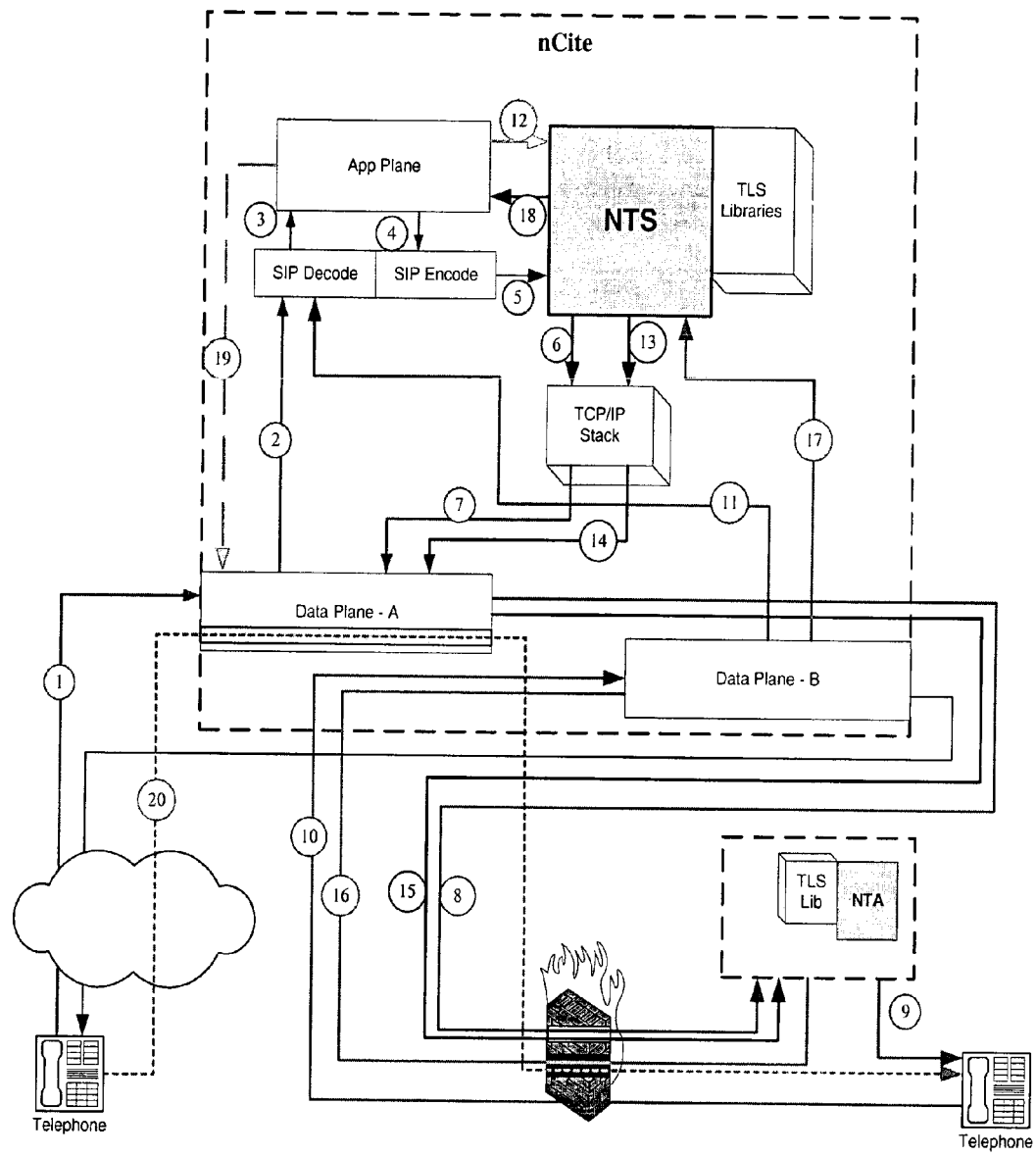
FIG. 8 is a block diagram of an embodiment of the software in the network processing system in accordance with the present invention.

Referring now to FIG. 8 a block diagram of the internal software in network processing system 38 from FIG. 1*b* is shown. While FIG. 8 will be described with reference to an inbound call, one skilled in the art will easily recognize that the direction of any signal referenced herein could have a counterpart in the opposite direction. Also, in discussing FIG. 8 reference will be made to reference numbers and the description from FIG. 1*b*.

Phone 28 connected to network 26 sends control signal 31, which is an INVITE message for phone 14 inside the enterprise network. The control signal 31 is recognized by Data Plane A of network processing system 38 as an INVITE message and sent to SIP Decode where it is parsed and sent to App Plane. App Plane is modified and encoded for transmit.

From App Plane the INVITE is sent to NTS for transmission to phone 14. NTS creates an authentication header for the INVITE message and then encapsulates the INVITE message and authentication header into a message to be transmitted to traversal client 36 using secured connections 35. NTS sends the encapsulated message to TCP/IP Stack which forwards the message to traversal client 36 through Data Plane A. Traversal client 36 receives the packet, de-encapsulates the INVITE message and transmits it to phone 14.

Phone 14 responds with a control message, such as a 200 OK SIP message containing SDP, on control signal 31. The control message is recognized by Data Plane B of network processing system 38, which then send the message to App Plane via SIP Decode. The App Plane sends the bearer channel parameters for the network processing systems NAT function to the NTS. Because this is a call from the public side of NAT/firewall, a Test Packet, as described in FIG. 7 is sent from the NTS to the traversal client 36. The Test packet includes an authentication header, which is used to authenticate the Test Packet after the network processing system 38 receives it from the traversal client 36. Additionally an Anchor packet, as shown in FIG. 7, is generated and sent with the Test Packet to traversal client 36.

Traversal client 36 receives the Anchor message and Test Packet and retransmits the Test Packet. The Test Packet passes through NAT/firewall 22 which opens a pinhole in the NAT/firewall and modifies the Test Packet with the NAPT translation to be used by the NAT/firewall 22. The NTS of network processing system 38 recognizes the Test Packet and extracts the NAPT information used by NAT/firewall 22. That information is used by App Plane for pinhole creation in network processing system 38. The App Plane allocates a pinhole in Data Plane A with NAT translation. Finally media channel 33 is created and allowed to flow through both network processing system 38 and NAT/firewall 22 to phone 14.

Although FIG. 8 was discussed with reference to an inbound call such as was described in FIG. 7, one skilled in the art could easily understand and outbound call such as that described in FIG. 6 by the same mechanism described in FIG. 8.

While the header preprocessor, the QoS processors, and the flow management processor described with reference to FIGS. 3 and 4 can be any suitable processor capable of executing the described functions, in the preferred embodiment the header preprocessor is the Fast Pattern Processor (FPP), the QoS processor is the Routing Switch Processor (RSP), and the flow management processor is the ASI processor, all manufactured by the Agere Division of Lucent Technologies, Austin Tex. The microprocessor described with reference to FIG. 3 and the management module of FIG. 4 could be any suitable microprocessor including the PowerPC line of microprocessors from Motorola, Inc., or the X86 or Pentium line of microprocessors available from Intel Corporation. Although particular references have been made to specific protocols such as SIP, H323, or MGCP, implementations and materials, those skilled in the art should understand that the network processing system can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A system for traversing a network address translation/firewall device, having a public side and a private side, with network traffic, the network traffic passing between a device on the private side and a device on the public side; the system comprising:
    a network processing system on the public side of the network address translation/firewall device, the network processing system operable to anchor network traffic to and from the private side of the network address translation/firewall device; and
    a traversal client on the private side of the network address translation/firewall device having a secure connection with the network processing system, wherein the traversal client is operable to pass packets through the network address translation/firewall device in order to create allocations in the network address translation/firewall device to allow the network traffic to pass between the private side device and the public side device, and wherein the traversal client does not reside in the path of the traffic between the private side device and the public side device.

2. The system of claim 1 wherein the anchoring by the network processing system is accomplished by substituting the address associated with the private side device with an address assigned to the network processing system.

3. The system of claim 1 wherein the packets sent by the traversal client through the network address translation/firewall to create allocations in the network address translation/firewall device are formed in the network processing system and sent to the traversal client over the secure connection.

4. The system of claim 1 wherein the network traffic is a voice-over-Internet Protocol session.

5. The system of claim 4 wherein the voice-over-Internet Protocol session uses SIP messaging.

6. The system of claim 4 wherein the voice-over-Internet-Protocol session includes signaling traffic separate from the bearer traffic, and wherein the signaling traffic from the public side device is transmitted to the private side device using the traversal client and the secure connection.

7. The system of claim 4 wherein the private side device must register with a registrar on the public side of the network address translation/firewall device in order to receive voice-over-Internet-Protocol calls.

8. A method for traversing a network address translation/firewall device, having a public side and a private side, with bidirectional network traffic, the bidirectional network traffic passing between a device on the private side and a device on the public side; the system comprising:
    receiving packets at a network processing system, the network processing system on the public side of the network address translation/firewall device;
    passing control information bound for the private side device through a traversal client, the traversal client having a secure connection with the network processing system;
    creating allocations in the network address translation/firewall device to allow the bidirectional network traffic through the network address translation/firewall device, the allocations created by sending a test packet from the traversal client to the network processing system through the network address translation/firewall device, wherein the traversal client does not reside in the path of the traffic between the private side device and the public side device.

9. The method of claim 8 further comprising the step of anchoring the network traffic to and from the private side of the network address translation/firewall device using the network processing system.

10. The method of claim 9 wherein the step of anchoring is accomplished by substituting the address associated with the private side device with an address assigned to the network processing system.

11. The method of claim 8 wherein the test packet sent by the traversal client through the network address translation/firewall to create allocations in the network address translation/firewall device are formed in the network processing system and sent to the traversal client over the secure connection.

12. The method of claim 8 wherein the traffic is a voice-over-Internet Protocol session.

13. The method of claim 12 wherein the voice-over-Internet Protocol session uses SIP messaging.

14. The method of claim 13 wherein the voice-over-Internet-Protocol session includes signaling traffic separate from the bearer traffic, and wherein the signaling traffic from the public side device is transmitted to the private side device using the traversal client and the secure connection.

15. The method of claim 12 wherein the private side device must register with a registrar on the public side of the network address translation/firewall device in order to receive voice-over-Internet-Protocol calls.

* * * * *